(12) United States Patent
Gerardi et al.

(10) Patent No.: US 12,491,250 B2
(45) Date of Patent: Dec. 9, 2025

(54) ORAL COMPOSITION WITH NANOCRYSTALLINE CELLULOSE

(71) Applicant: NICOVENTURES TRADING LIMITED, London (GB)

(72) Inventors: Anthony Richard Gerardi, Winston-Salem, NC (US); Andries Don Sebastian, Winston-Salem, NC (US); Ronald K. Hutchens, East Bend, NC (US); Christopher Keller, Advance, NC (US); Thomas H. Poole, Winston-Salem, NC (US); Dwayne William Beeson, Kernersville, NC (US); Frank Kelley St. Charles, Bowling Green, KY (US)

(73) Assignee: NICOVENTURES TRADING LIMITED, London (GB)

( * ) Notice: Subject to any disclaimer, the term of this patent is extended or adjusted under 35 U.S.C. 154(b) by 336 days.

(21) Appl. No.: 16/707,164

(22) Filed: Dec. 9, 2019

(65) Prior Publication Data

US 2021/0170031 A1 Jun. 10, 2021

(51) Int. Cl.
| | | |
|---|---|---|
| A61K 47/38 | (2006.01) | |
| A24B 13/00 | (2006.01) | |
| A24B 15/16 | (2020.01) | |
| A61K 9/06 | (2006.01) | |
| A61K 9/12 | (2006.01) | |
| A61K 9/70 | (2006.01) | |
| A61K 31/465 | (2006.01) | |
| A61K 36/185 | (2006.01) | |
| A61K 47/10 | (2017.01) | |

(52) U.S. Cl.
CPC ............. *A61K 47/38* (2013.01); *A24B 13/00* (2013.01); *A24B 15/16* (2013.01); *A61K 9/06* (2013.01); *A61K 9/122* (2013.01); *A61K 9/7007* (2013.01); *A61K 31/465* (2013.01); *A61K 36/185* (2013.01); *A61K 47/10* (2013.01)

(58) Field of Classification Search
CPC .......... A61K 47/38; A61K 9/06; A61K 9/122; A61K 9/7007; A61K 31/465; A61K 36/185; A61K 47/10; A24B 13/00; A24B 15/16
See application file for complete search history.

(56) References Cited

U.S. PATENT DOCUMENTS

| | | |
|---|---|---|
| 5,417,229 A | 5/1995 | Summers et al. |
| 6,138,683 A | 10/2000 | Hersh et al. |
| 6,845,777 B2 | 1/2005 | Pera |
| 6,958,143 B2 | 10/2005 | Choi et al. |
| 7,032,601 B2 | 4/2006 | Atchley et al. |
| 7,056,541 B1 | 6/2006 | Stahl et al. |
| 7,507,427 B2 | 3/2009 | Andersen et al. |
| 7,810,507 B2 | 10/2010 | Dube et al. |
| 7,833,555 B2 | 11/2010 | Andersen et al. |
| 7,861,728 B2 | 1/2011 | Holton, Jr. et al. |
| 7,900,637 B2 | 3/2011 | Fagerstrom et al. |
| 7,950,399 B2 | 5/2011 | Winterson et al. |
| 8,069,861 B2 | 12/2011 | Sinclair |
| 8,124,147 B2 | 2/2012 | Cheng et al. |
| 8,293,295 B2 | 10/2012 | Andersen et al. |
| 8,336,557 B2 | 12/2012 | Kumar et al. |
| 8,343,532 B2 | 1/2013 | Dam et al. |
| 8,424,541 B2 | 4/2013 | Crawford et al. |
| 8,469,036 B2 | 6/2013 | Williams et al. |
| 8,469,037 B2 | 6/2013 | Liu et al. |
| 8,529,875 B2 | 9/2013 | Andersen |
| 8,529,914 B2 | 9/2013 | Fuisz et al. |
| 8,545,870 B2 | 10/2013 | Dupinay et al. |
| 8,591,967 B2 | 11/2013 | Andersen et al. |
| 8,613,285 B2 | 12/2013 | Fuisz |
| 8,627,828 B2 | 1/2014 | Strickland et al. |
| 8,642,016 B2 | 2/2014 | Chau et al. |
| 8,714,163 B2 | 5/2014 | Kumar et al. |
| 8,741,348 B2 | 6/2014 | Hansson et al. |
| 8,747,562 B2 | 6/2014 | Mishra et al. |
| 8,828,361 B2 | 9/2014 | Anderson |
| 8,833,378 B2 | 9/2014 | Axelsson et al. |
| 8,846,075 B2 | 9/2014 | Johnson et al. |
| 8,858,984 B2 | 10/2014 | Dam et al. |
| 8,863,755 B2 | 10/2014 | Zhuang et al. |
| 8,871,243 B2 | 10/2014 | Fankhauser et al. |
| 8,931,493 B2 | 1/2015 | Sebastian et al. |
| 8,945,593 B2 | 2/2015 | LoCoco et al. |
| 8,978,661 B2 | 3/2015 | Atchley et al. |
| 8,992,974 B2 | 3/2015 | McCarty |

(Continued)

FOREIGN PATENT DOCUMENTS

| | | |
|---|---|---|
| CN | 103005680 | 4/2013 |
| CN | 103263507 | 8/2013 |

(Continued)

OTHER PUBLICATIONS

Schuster et al. "TENCEL®—Natural intelligence by adaptive nanofibril structure," Nov. 2006, pp. 1-13. (Year: 2006).*

(Continued)

*Primary Examiner* — Doan T Phan

(74) *Attorney, Agent, or Firm* — WOMBLE BOND DICKINSON (US) LLP; Scott R. Breining

(57) ABSTRACT

The disclosure provides a composition including nanocellulose and at least one active ingredient. Further provided is a fleece material including a nonwoven fabric and nanocellulose. The nanocellulose may be cellulose nanofibrils, nanocrystalline cellulose, or bacterial cellulose.

10 Claims, 1 Drawing Sheet

(56) References Cited

U.S. PATENT DOCUMENTS

| | | | |
|---|---|---|---|
| 9,027,567 B2 | 5/2015 | Gee et al. |
| 9,039,839 B2 | 5/2015 | Beeson et al. |
| 9,044,035 B2 | 6/2015 | Jackson et al. |
| 9,084,439 B2 | 7/2015 | Holton, Jr. |
| 9,155,321 B2 | 10/2015 | Cantrell et al. |
| 9,161,567 B2 | 10/2015 | Shikata et al. |
| 9,161,908 B2 | 10/2015 | Nilsson |
| 9,167,835 B2 | 10/2015 | Sengupta et al. |
| 9,185,931 B2 | 11/2015 | Gao et al. |
| 9,204,667 B2 | 12/2015 | Cantrell et al. |
| 9,237,768 B2 | 1/2016 | Carroll et al. |
| 9,358,296 B2 | 6/2016 | McCarty |
| 9,372,033 B2 | 6/2016 | Lampe et al. |
| 9,386,800 B2 | 7/2016 | Sebastian et al. |
| 9,402,414 B2 | 8/2016 | Griscik et al. |
| 9,402,809 B2 | 8/2016 | Axelsson et al. |
| 9,414,624 B2 | 8/2016 | Carroll et al. |
| 9,420,825 B2 | 8/2016 | Beeson et al. |
| 9,468,233 B2 | 10/2016 | Macko et al. |
| 9,474,303 B2 | 10/2016 | Holton, Jr. |
| 9,521,864 B2 | 12/2016 | Gao et al. |
| 9,565,867 B2 | 2/2017 | Wittorff et al. |
| 9,629,392 B2 | 4/2017 | Holton, Jr. |
| 9,635,881 B2 | 5/2017 | Sjögren et al. |
| 9,675,102 B2 | 6/2017 | Hunt et al. |
| 9,763,928 B2 | 9/2017 | Duggins et al. |
| 9,775,376 B2 | 10/2017 | Cantrell et al. |
| 9,801,409 B1 | 10/2017 | Smith |
| 9,848,634 B2 | 12/2017 | Fuisz |
| 9,854,830 B2 | 1/2018 | Gao et al. |
| 9,884,015 B2 | 2/2018 | Gao et al. |
| 9,907,748 B2 | 3/2018 | Borschke et al. |
| 9,925,145 B2 | 3/2018 | Hubinette et al. |
| 9,930,909 B2 | 4/2018 | Gao et al. |
| 9,999,243 B2 | 6/2018 | Gao et al. |
| 10,039,309 B2 | 8/2018 | Carroll et al. |
| 10,045,976 B2 | 8/2018 | Fusco et al. |
| 10,092,715 B2 | 10/2018 | Axelsson et al. |
| 10,130,120 B2 | 11/2018 | Mishra et al. |
| 10,143,230 B2 | 12/2018 | Mishra et al. |
| 10,149,850 B2 | 12/2018 | Mishra et al. |
| 10,172,810 B2 | 1/2019 | McCarty |
| 10,244,786 B2 | 4/2019 | Gao et al. |
| 10,334,873 B2 | 7/2019 | Mishra et al. |
| 10,357,054 B2 | 7/2019 | Marshall et al. |
| 10,375,984 B2 | 8/2019 | Hernandez Garcia et al. |
| 10,390,557 B2 | 8/2019 | Börjesson et al. |
| 10,426,726 B2 | 10/2019 | Neergaard |
| 10,463,070 B2 | 11/2019 | Carroll et al. |
| 10,532,046 B2 | 1/2020 | Rogers et al. |
| 10,543,205 B2 | 1/2020 | Wittorff et al. |
| 2004/0118422 A1 | 6/2004 | Lundin et al. |
| 2007/0031539 A1 | 2/2007 | Calton |
| 2008/0081071 A1 | 4/2008 | Sanghvi et al. |
| 2008/0166395 A1 | 7/2008 | Roush |
| 2009/0023819 A1 | 1/2009 | Axelsson |
| 2009/0065013 A1 | 3/2009 | Essen et al. |
| 2009/0253754 A1 | 10/2009 | Selmin et al. |
| 2009/0301504 A1 | 12/2009 | Worthen et al. |
| 2010/0004294 A1 | 1/2010 | Axelsson et al. |
| 2010/0061940 A1 | 3/2010 | Axelsson et al. |
| 2010/0187143 A1 | 7/2010 | Essen et al. |
| 2010/0260690 A1 | 10/2010 | Kristensen et al. |
| 2010/0294292 A1 | 11/2010 | Hodin et al. |
| 2011/0139164 A1 | 6/2011 | Mua et al. |
| 2011/0220130 A1 | 9/2011 | Mua et al. |
| 2011/0268809 A1 | 11/2011 | Brinkley et al. |
| 2012/0031415 A1 | 2/2012 | Essen et al. |
| 2012/0037175 A1 | 2/2012 | Cantrell et al. |
| 2012/0103353 A1 | 5/2012 | Sebastian et al. |
| 2013/0078307 A1 | 3/2013 | Holton, Jr. et al. |
| 2013/0118512 A1 | 5/2013 | Jackson et al. |
| 2013/0122071 A1* | 5/2013 | Cathala ............... C09K 23/007 424/401 |
| 2013/0152953 A1 | 6/2013 | Mua et al. |
| 2013/0177646 A1 | 7/2013 | Hugerth et al. |
| 2013/0206150 A1 | 8/2013 | Duggins et al. |
| 2013/0251779 A1 | 9/2013 | Svandal et al. |
| 2013/0276805 A1* | 10/2013 | Mola ................. A24F 23/02 112/475.01 |
| 2013/0330379 A1* | 12/2013 | Ylipertula ........... C12N 5/0621 424/400 |
| 2013/0330417 A1* | 12/2013 | Dong .................... A61L 15/28 424/618 |
| 2013/0340773 A1 | 12/2013 | Sebastian et al. |
| 2014/0130813 A1 | 5/2014 | Strehle |
| 2014/0154301 A1 | 6/2014 | Chau et al. |
| 2014/0255452 A1 | 9/2014 | Reddick et al. |
| 2014/0322327 A1* | 10/2014 | Laukkanen ......... A61K 31/216 514/420 |
| 2015/0068544 A1 | 3/2015 | Moldoveanu et al. |
| 2015/0068545 A1 | 3/2015 | Moldoveanu et al. |
| 2015/0071972 A1 | 3/2015 | Holton, Jr. et al. |
| 2015/0096573 A1 | 4/2015 | Gao et al. |
| 2015/0096574 A1 | 4/2015 | Gao et al. |
| 2015/0096576 A1 | 4/2015 | Gao et al. |
| 2015/0296868 A1 | 10/2015 | Sutton |
| 2015/0368368 A1* | 12/2015 | Retsina ................ C09D 101/04 106/203.2 |
| 2016/0000140 A1 | 1/2016 | Sebastian et al. |
| 2016/0073676 A1 | 3/2016 | Cantrell et al. |
| 2016/0073689 A1 | 3/2016 | Sebastian et al. |
| 2016/0157515 A1* | 6/2016 | Chapman ............ A24B 15/282 131/352 |
| 2016/0186377 A1 | 6/2016 | Haldane et al. |
| 2016/0192703 A1 | 7/2016 | Sebastian et al. |
| 2016/0369121 A1* | 12/2016 | Lapidot .................... A01C 1/06 |
| 2017/0007594 A1 | 1/2017 | Borschke |
| 2017/0028672 A1* | 2/2017 | Lim ........................ B29C 70/12 |
| 2017/0164651 A1 | 6/2017 | Mua et al. |
| 2017/0165252 A1 | 6/2017 | Mua et al. |
| 2017/0172995 A1 | 6/2017 | Repaka et al. |
| 2017/0280764 A1 | 10/2017 | Sahlen et al. |
| 2017/0312261 A1 | 11/2017 | Changoer et al. |
| 2017/0318858 A1 | 11/2017 | Hodin et al. |
| 2018/0044856 A1* | 2/2018 | Dhumpa ................. D04H 1/4382 |
| 2018/0140007 A1 | 5/2018 | Aspgren et al. |
| 2018/0140521 A1 | 5/2018 | Geonnotti et al. |
| 2018/0140554 A1 | 5/2018 | Wittorff |
| 2018/0153211 A1 | 6/2018 | Persson |
| 2018/0235273 A1 | 8/2018 | Carroll et al. |
| 2018/0255826 A1 | 9/2018 | Persson et al. |
| 2018/0257801 A1 | 9/2018 | Persson |
| 2019/0037909 A1 | 2/2019 | Greenbaum et al. |
| 2019/0255035 A1 | 8/2019 | Bruun |
| 2020/0037638 A1 | 2/2020 | Faraci et al. |
| 2020/0128870 A1 | 4/2020 | Hassler et al. |
| 2020/0138706 A1 | 5/2020 | Rudraraju et al. |
| 2020/0275689 A1 | 9/2020 | Lewerenz |
| 2020/0297026 A1 | 9/2020 | Kannisto et al. |
| 2020/0305496 A1 | 10/2020 | Gessesse |

FOREIGN PATENT DOCUMENTS

| | | |
|---|---|---|
| CN | 103494324 | 1/2014 |
| CN | 105192876 | 12/2015 |
| CN | 105595404 | 5/2016 |
| CN | 108649170 | 10/2018 |
| EA | 033140 B1 | 8/2019 |
| RU | 2570470 C2 | 12/2015 |
| WO | 2007084587 A2 | 7/2007 |
| WO | WO2016/067226 | 5/2016 |
| WO | WO2016/090075 | 6/2016 |
| WO | WO-2018009139 A1 * | 1/2018 ............ A61K 9/006 |
| WO | WO2019/036243 | 2/2019 |

OTHER PUBLICATIONS

Salajková et al. "Hydrophobic cellulose nanocrystals modified with quaternary ammonium salts." J. Mater. Chem., 2012, 22: 19798-19805. (Year: 2012).*

(56) References Cited

OTHER PUBLICATIONS

Ali Ashjaran et al: "Overview of bio nanofabric from bacterial cellulose", The Journal of the Textile Institute, vol. 104, No. 2, Feb. 1, 2013 (Feb. 1, 2013), pp. 121-131.
Robichaud Meagan et al., "Tobacco companies introduce 'tobacco free' nicotine pouches", Tob Control 2019, Nov. 21, 2019, 1-2, National Library of Medicine, doi:10.1136/tobaccocontrol-2019-055321.
Shit, Subhas et al., "Edible Polymers: Challenges and Opportunities", Journal of Polymers vol. 2014, Article ID 427259, 13 pages; http://dx.doi.org/10.1155/2014/427259.
Vieira, Melissa et al., "Natural-based plasticizers and biopolymer films: A review", European Polymer Journal 47, (2011), 254-263.

* cited by examiner

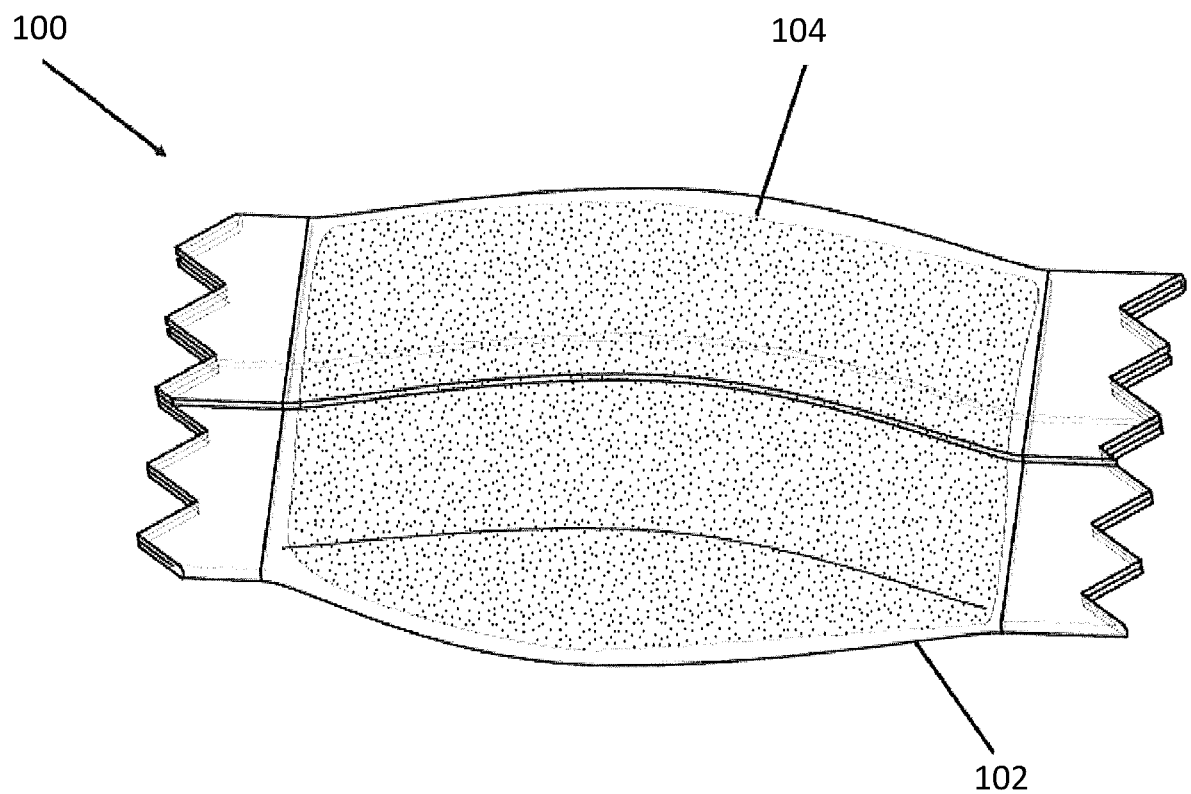

ORAL COMPOSITION WITH NANOCRYSTALLINE CELLULOSE

FIELD OF THE DISCLOSURE

The present disclosure relates to compositions intended for human use. The compositions are configured for oral use and deliver substances such as flavors and/or active ingredients during use. Such products may include tobacco or a product derived from tobacco, or may be tobacco-free alternatives.

BACKGROUND

Tobacco may be enjoyed in a so-called "smokeless" form. Particularly popular smokeless tobacco products are employed by inserting some form of processed tobacco or tobacco-containing formulation into the mouth of the user. Conventional formats for such smokeless tobacco products include moist snuff, snus, and chewing tobacco, which are typically formed almost entirely of particulate, granular, or shredded tobacco, and which are either portioned by the user or presented to the user in individual portions, such as in single-use pouches or sachets. Other traditional forms of smokeless products include compressed or agglomerated forms, such as plugs, tablets, or pellets. Alternative product formats, such as tobacco-containing gums and mixtures of tobacco with other plant materials, are also known. See for example, the types of smokeless tobacco formulations, ingredients, and processing methodologies set forth in U.S. Pat. No. 1,376,586 to Schwartz; U.S. Pat. No. 4,513,756 to Pittman et al.; U.S. Pat. No. 4,528,993 to Sensabaugh, Jr. et al.; 4,624,269 to Story et al.; U.S. Pat. No. 4,991,599 to Tibbetts; U.S. Pat. No. 4,987,907 to Townsend; U.S. Pat. No. 5,092,352 to Sprinkle, III et al.; U.S. Pat. No. 5,387,416 to White et al.; U.S. Pat. No. 6,668,839 to Williams; U.S. Pat. No. 6,834,654 to Williams; U.S. Pat. No. 6,953,040 to Atchley et al.; U.S. Pat. No. 7,032,601 to Atchley et al.; and 7,694,686 to Atchley et al.; US Pat. App. Pub. Nos. 2004/0020503 to Williams; 2005/0115580 to Quinter et al.; 2006/0191548 to Strickland et al.; 2007/0062549 to Holton, Jr. et al.; 2007/0186941 to Holton, Jr. et al.; 2007/0186942 to Strickland et al.; 2008/0029110 to Dube et al.; 2008/0029116 to Robinson et al.; 2008/0173317 to Robinson et al.; 2008/0209586 to Neilsen et al.; 2009/0065013 to Essen et al.; and 2010/0282267 to Atchley, as well as WO2004/095959 to Arnarp et al., each of which is incorporated herein by reference.

Smokeless tobacco product configurations that combine tobacco material with various binders and fillers have been proposed more recently, with example product formats including lozenges, pastilles, gels, extruded forms, and the like. See, for example, the types of products described in US Patent App. Pub. Nos. 2008/0196730 to Engstrom et al.; 2008/0305216 to Crawford et al.; 2009/0293889 to Kumar et al.; 2010/0291245 to Gao et al; 2011/0139164 to Mua et al.; 2012/0037175 to Cantrell et al.; 2012/0055494 to Hunt et al.; 2012/0138073 to Cantrell et al.; 2012/0138074 to Cantrell et al.; 2013/0074855 to Holton, Jr.; 2013/0074856 to Holton, Jr.; 2013/0152953 to Mua et al.; 2013/0274296 to Jackson et al.; 2015/0068545 to Moldoveanu et al.; 2015/0101627 to Marshall et al.; and 2015/0230515 to Lampe et al., each of which is incorporated herein by reference.

All-white snus portions are growing in popularity, and offer a discrete and aesthetically pleasing alternative to traditional snus. Such modern "white" pouched products may include a bleached tobacco or may be tobacco-free.

BRIEF SUMMARY

The present disclosure generally provides compositions comprising nanocellulose. In one aspect, the disclosure provides a composition comprising nanocellulose and at least one active ingredient. In some embodiments, the active ingredient comprises one or more botanical materials, flavorants, stimulants, amino acids, vitamins, antioxidants, nicotine components, cannabinoids, pharmaceutical agents, nutraceuticals, or combinations thereof.

In some embodiments, the nanocellulose is in the form of particles, a gel, a film, or a foam. In some embodiments, the active ingredient is one or both of absorbed on and adsorbed in the nanocellulose. In some embodiments, the nanocellulose is in the form of a foam. In some embodiments, the nanocellulose is in the form of a gel, the gel further comprising glycerine.

In some embodiments, the nanocellulose comprises cellulose nanofibrils having a diameter and length, wherein the diameter is from about 1 to about 100 nm, and the length is from about 1 to about 10 micrometers. In some embodiments, the nanocellulose comprises cellulose nanocrystals having a diameter and length, wherein the diameter is from about 5 to about 20 nm, and the length is from about 50 to about 400 nanometers.

In some embodiments, the nanocellulose comprises bacterial cellulose.

In some embodiments, the nanocellulose has been hydrophobically modified.

In some embodiments, the composition comprises at least about 10% by weight of the nanocellulose; at least about 0.1% of the active ingredient; and further comprises water in an amount of at least about 5% by weight, based on the total weight of the composition. In some embodiments, the composition further comprises one or more salts, one or more organic acids, one or more sweeteners, one or more binding agents, one or more humectants, one or more gums, a tobacco material, or combinations thereof.

In another aspect is provided a fleece material comprising a nonwoven fabric and nanocellulose. In some embodiments, the fleece material comprises at least about 10% by weight of the nanocellulose. In some embodiments, the nanocellulose comprises cellulose nanofibrils having a diameter and length, wherein the diameter is from about 1 to about 100 nm, and the length is from about 1 to about 10 micrometers. In some embodiments, the nanocellulose comprises cellulose nanocrystals having a diameter and length, wherein the diameter is from about 5 to about 20 nm, and the length is from about 50 to about 400 nanometers. In some embodiments, the nanocellulose comprises bacterial cellulose. In some embodiments, the nanocellulose has been hydrophobically modified.

In some embodiments, the fleece material further comprises an active ingredient comprising one or more botanical materials, flavorants, stimulants, amino acids, vitamins, antioxidants, nicotine components, cannabinoids, pharmaceutical agents, nutraceuticals, or a combination thereof, disposed on or absorbed in the fleece material.

The disclosure includes, without limitations, the following embodiments.

Embodiment 1: A composition comprising nanocellulose and at least one active ingredient.

Embodiment 2: The composition of embodiment 1, wherein the active ingredient comprises one or more botanical materials, flavorants, stimulants, amino acids, vitamins, antioxidants, nicotine components, cannabinoids, pharmaceutical agents, nutraceuticals, or combinations thereof.

Embodiment 3: The composition of embodiment 1 or 2, wherein the nanocellulose is in the form of particles, a gel, a film, or a foam.

Embodiment 4: The composition of any one of embodiments 1 to 3, wherein the active ingredient is one or both of absorbed on and adsorbed in the nanocellulose.

Embodiment 5: The composition of any one of embodiments 1 to 4, wherein the nanocellulose is in the form of a foam.

Embodiment 6: The composition of any one of embodiments 1 to 3, wherein the nanocellulose is in the form of a gel, the gel further comprising glycerine.

Embodiment 7: The composition of any one of embodiments 1 to 6, wherein the nanocellulose comprises cellulose nanofibrils having a diameter and length, wherein the diameter is from about 1 to about 100 nm, and the length is from about 1 to about 10 micrometers.

Embodiment 8: The composition of any one of embodiments 1 to 7, wherein the nanocellulose comprises cellulose nanocrystals having a diameter and length, wherein the diameter is from about 5 to about 20 nm, and the length is from about 50 to about 400 nanometers.

Embodiment 9: The composition of any one of embodiments 1 to 8 wherein the nanocellulose comprises bacterial cellulose.

Embodiment 10: The composition of any one of embodiments 1 to 9, wherein the nanocellulose has been hydrophobically modified.

Embodiment 11: The composition of any one of embodiments 1 to 10, comprising: at least about 10% by weight of the nanocellulose; at least about 0.1% of the active ingredient; further comprising water in an amount of at least about 5% by weight, based on the total weight of the composition.

Embodiment 12: The composition of any one of embodiments 1 to 11, further comprising one or more salts, one or more organic acids, one or more sweeteners, one or more binding agents, one or more humectants, one or more gums, a tobacco material, or combinations thereof.

Embodiment 13: A fleece material comprising a nonwoven fabric and nanocellulose.

Embodiment 14: The fleece material of embodiment 13, comprising at least about 10% by weight of the nanocellulose.

Embodiment 15: The fleece material of any one of embodiments 13 or 14, wherein the nanocellulose comprises cellulose nanofibrils having a diameter and length, wherein the diameter is from about 1 to about 100 nm, and the length is from about 1 to about 10 micrometers.

Embodiment 16: The fleece material of any one of embodiments 13 to 15, wherein the nanocellulose comprises cellulose nanocrystals having a diameter and length, wherein the diameter is from about 5 to about 20 nm, and the length is from about 50 to about 400 nanometers.

Embodiment 17: The fleece material of any one of embodiments 13 to 16, wherein the nanocellulose comprises bacterial cellulose.

Embodiment 18: The fleece material of any one of embodiments 13 to 17, wherein the nanocellulose has been hydrophobically modified.

Embodiment 19: The fleece material of any one of embodiments 13 to 18, further comprising an active ingredient comprising one or more botanical materials, flavorants, stimulants, amino acids, vitamins, antioxidants, nicotine components, cannabinoids, pharmaceutical agents, nutraceuticals, or a combination thereof, disposed on or absorbed in the fleece material.

Embodiment 20: An oral product comprising nanocellulose and at least one active ingredient.

Embodiment 21: A pouched product comprising nanocellulose and at least one active ingredient.

Embodiment 22: The pouched product of embodiment 21, wherein at least a portion of the nanocellulose forms at least part of a pouch of the pouched product.

Embodiment 23: The pouched product of any one of embodiments 21 to 22, wherein at least a portion of the at least one active ingredient is at least partially retained on at least a portion of the nanocellulose.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise.

BRIEF DESCRIPTION OF THE DRAWING

Having thus described aspects of the disclosure in the foregoing general terms, reference will now be made to the accompanying drawing, which are not necessarily drawn to scale. The drawings are exemplary only, and should not be construed as limiting the disclosure.

FIG. 1 is a perspective view of a pouched product according to an example embodiment of the present disclosure including a pouch or fleece at least partially filled with a composition for oral use.

DETAILED DESCRIPTION

The present disclosure provides a composition comprising nanocellulose and at least one active ingredient. Further provided are products configured for oral use comprising the composition as described herein.

The present disclosure will now be described more fully hereinafter with reference to example embodiments thereof. These example embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. As used in this specification and the claims, the singular forms "a," "an," and "the" include plural referents unless the context clearly dictates otherwise. Reference to "dry weight percent" or "dry weight basis" refers to weight on the basis of dry ingredients (i.e., all ingredients except water). Reference to "wet weight" refers to the weight of the mixture including water. Unless otherwise indicated, reference to "weight percent" of a mixture reflects the total wet weight of the mixture (i.e., including water). Reference to "substantially free" in regard to certain components means that the referenced component is not present, has not been intentionally added, and/or is present in only trace amounts in the composition. For example, less than 1%, less than 0.1%, less than 0.01%, less than 0.001%, or 0% of the referenced component may be present by weight in the composition, based on the total weight of the composition.

Nanocellulose

As used herein, the term "nanocellulose" refers to cellulose having at least one average size dimension in the range of about 1 to about 100 nanometers (nm). Cellulose is composed of long chains of at least 500 glucose molecules (polysaccharide chains). Several of these polysaccharide chains are arranged in parallel arrays to form cellulose microfibrils (very fine fibrils, or fiber-like strands). The individual polysaccharide chains are bound together in the microfibrils by hydrogen bonds. The microfibrils, in turn, are bundled together to form macrofibrils. Cellulose microfibrils are laid down in the inner surface of the primary cell wall. As the cell absorbs water, its volume increases and the existing microfibrils separate and new ones are formed to help increase cell strength. The microfibrils of cellulose are extremely tough and inflexible due to the presence of hydrogen bonds, and have crystal-like properties As a non-limiting example, nanocellulose suitable for use in the present composition may be obtained from a fibrous cellulose material prepared from any variety of cellulose-containing source, such as wood (e.g., eucalyptus trees), grasses (e.g., bamboo), cotton, tobacco, algae, and other plant-based materials, wherein the fibrous cellulose material has been further refined such that a nano-scale fibrous cellulose is produced.

In some embodiments, the nanocellulose may be in the form of cellulose nanofibers (CNF; also called microfibrillated cellulose (MFC)), cellulose nanocrystals (CNC), or may be bacterial nanocellulose, each of which is different in shape, size and composition. Each such nanocellulose material is described further herein below.

Cellulose Nanofibrils (CNFs)

In some embodiments, the nanocellulose may be in the form of cellulose nanofibrils (CNFs). As used herein, the term "cellulose nanofibril" refers to a long and flexible nanocellulose with a high aspect ratio (typically from about 1-100 nm in diameter and several micrometers in length). CNFs may also be referred to as "nanofibrillated cellulose" (NFC), or "microfibrillated cellulose" (MFC). CNFs exhibit both amorphous and crystalline portions and present a web-like structure. The morphologies and dimensions of CNF can vary substantially, depending on the degree of fibrillation and pretreatment involved in the preparation.

CNF is pseudo-plastic and exhibits thixotropy, the property of certain gels or fluids that are viscous under normal conditions, but become less viscous when shaken or agitated. When the shearing forces are removed, the gel or fluid regains much of its original state. CNF has the ability to form a transparent film once it is dried. The physical properties are linked to the high specific area (at least ten times larger than that of cellulose fibers) and extensive hydrogen-bonding ability of the nanofibrils.

CNFs may be isolated from plant cell walls through homogenization using one or more enzymatic, chemical or mechanical treatments, including such techniques as dewaxing, chlorite delignification, alkaline extraction of hemicelluloses, mild acid hydrolysis coupled with steam explosion, grinding, high shear refining, high-pressure homogenization, high-intensity ultrasonic treatments, and cryocrushing. For example, CNFs may be isolated from any cellulose-containing source, including wood-based fibers (pulp fibers), using mechanical methods which expose the pulp to high shear forces, ripping the larger fibers apart into nanofibers. For this purpose, high-pressure homogenizers, ultrasonic homogenizers, grinders or microfluidizers can be used to delaminate the cell walls of the fibers and liberate the nano-sized fibrils. Materials and methods that can be useful for providing tobacco-derived nanocellulose are described in U.S. Pat. No. 10,196,778 to Sebastian et al., which is incorporated herein by reference in its entirety.

Cellulose Nanocrystals (CNCs)

In some embodiments, the nanocellulose may be in the form of cellulose nanocrystals (CNCs). As used herein, the term "cellulose nanocrystal" refers to rod-like, highly crystalline (>70%) nanocellulose isolated from plant cell walls, having dimensions of both length and diameter at the nano-scale, typically in the range of from about 5 to 20 nm in diameter and from about 50-400 nm in length, depending on the nature of the source material and isolation conditions. The major difference between the CNCs and CNFs lies in their amorphous portions (dis-ordered region) and length dimensions.

CNCs can be obtained from various cellulose starting materials, including algae cellulose, cotton linters, and microcrystalline cellulose (MCC). They are typically prepared by acid hydrolysis of the cellulose material by strong acid (e.g., $H_2SO_4$), which destroys the amorphous portion, leaving behind after processing a highly crystalline residue. The cellulose source material may first be submitted to a bleaching treatment with NaOH in order to purify the cellulose by removing other constituents. The bleached material is then disintegrated in water, and the resulting suspension submitted to acid hydrolysis.

Bacterial Cellulose

In some embodiments, the nanocellulose may be in the form of bacterial cellulose. As used herein, the term "bacterial cellulose" refers to a natural nanocellulose synthesized by certain bacteria, and which consists of an ultra-fine network of cellulose nanofibers of from about 3 to about 100 nm in diameter and several micrometers in length, and which are highly uni-axially oriented. The degree of polymerization for bacterial cellulose, which is an average value of the number of monomer units, is around 300. Bacterial cellulose generally exhibits a higher degree of crystallinity than plant-based cellulose, and has higher water holding capacity, tensile strength, and fiber content, as well as a softer texture, relative to plant-based cellulose. Bacterial cellulose may be obtained by microbial fermentation in static or agitated cultures of, for example, microbes of the species *Acetobacter, Achromobacter, Aerobacter, Agrobacterium, Alcaligenes, Gluconacetobacter, Pseudomonas*, or *Rhozobium*. In some embodiments, the microbe is *Acetobacter xylinum* or *Gluconacetobacter xylinus*.

Modified Nanocellulose

In some embodiments, the nanocellulose may be further processed to alter its properties, for example, by chemical modification. Nanocellulose is naturally hydrophilic in nature, and thus exhibits a high degree of absorption of hydrophilic materials. In certain embodiments, the hydrophobicity of the nanocellulose can be enhanced in order to improve chemical compatibility of the nanocellulose with a hydrophobic component (e.g., a lipophilic active ingredient or flavoring). Enhancing hydrophobicity of a nanocellulose material surface typically involves either physical interaction/adsorption of hydrophobic molecules onto the surface or grafting hydrophobic molecules onto the surface via chemical bonding, or a combination of such techniques. Examples of agents that can be physically adsorbed or otherwise associated with a nanocellulose surface include poly-DADMAC (polydiallyldimethylammonium chloride), cetrimonium bromide, and perfluoro-octadecanoic acid. Examples of chemical modification/grafting agents include acetic anhydride, hexamethyl disilazane, and hydroxyethylmethacrylate. Methylation and silylation are examples of grafting techniques that can increase hydrophobicity of a surface. See, also, the additives set forth in Missoum et al. Nanofibrillated Cellulose surface Modifications: A Review, Materials, 2013, 6, 1745-1766; Dufresne et al, Nanocellulose: A New Ageless Bio Nanomaterial, Materials Today, 16 (6), 2013, 220-227; Peng et al, Chemistry and Applications of Nanocrystalline Cellulose and its Derivatives: A Nanotechnology Perspective, Canadian Journal of Chemical Engineering, 9999, 2011, 1-16; and Wang and Piao, From Hydrophilicity to Hydrophobicity: A Critical Review—part II: Hydrophobic Conversion, Wood and Fiber Science, 43(1), 2011, 41-46, each of which is incorporated by reference herein.

Forms of Nanocellulose

The nanocellulose may be present in the composition in various forms, including gels, shreds, films, suspensions, extrusions, shavings, capsules, and/or particles (including pellets, beads, strips, or any desired particle shape of varying sizes) and combinations thereof.

In some embodiments, the nanocellulose is in the form of a film or layer. A nanocellulose film can be formed e.g., by agitating a nanocellulose (e.g., CNF) suspension in a high shear mixer and casting the suspension onto a moving plastic support web. The plastic support web may be pretreated using a plasma device with a predetermined power level. After mixing, air may be removed from the CNF suspension by mixing in a vacuum. After such further mixing, the required amount of CNF suspension for film making is cast on the plastic support web to form a film. The formed nanocellulose film may be allowed to dry in ambient conditions for a required time and then detached from the plastic support web. Optionally, the nanocellulose film may be smoothed using pressing or calendaring methods. The nanocellulose film or layer may further be coated with a coating, or impregnated with an active ingredient, a flavoring, or both, each as described herein. In some embodiments, the coating may include an active ingredient, a flavoring, or both.

In some embodiments, the nanocellulose is in the form of a foam or aerogel. Pure nanocellulose aerogels may be obtained, for example, by applying various freeze-drying and super critical $CO_2$ drying techniques. Structured porous cellulose foams may also be obtained by utilizing a freeze-drying technique on cellulose generated by *Gluconobacter* strains of bacteria. In some embodiments, the nanocellulose foam or aerogel is prepared with or impregnated with an active ingredient, a flavoring, or both, each as described herein.

In some embodiments, the nanocellulose is in the form of a gel. For example, the nanocellulose may be gelled with certain additives, such as glycerol, to form a stable gel. In some embodiments, the nanocellulose gel is prepared with or impregnated with an active ingredient, a flavoring, or both, each as described herein. In some embodiments, the composition comprises a nanocellulose gel and an active ingredient, the nanocellulose gel comprising nanocellulose and glycerol.

In some embodiments, the nanocellulose may be present in particulate form, e.g., as a filler material on or in which is disposed an active ingredient, a flavoring, or both, each as described herein. For example, the nanocellulose may replace some or all of the traditional filler which is typically present in oral products (e.g., microcrystalline cellulose and/or cellulose derivatives, such as described herein below).

In some embodiments, the nanocellulose may be present as a component of a fleece pouch material. In such embodiments, the fleece material comprising the nanocellulose may be prepared with or be impregnated with an active ingredient, a flavoring, or both, each as described herein.

Active Ingredient

The composition as disclosed herein comprises at least one active ingredient including, but not limited to, a nicotine component, a botanical ingredient (e.g., hemp, lavender, peppermint, eucalyptus, rooibos, fennel, cloves, chamomile, basil, rosemary, clove, citrus, ginger, cannabis, ginseng, maca, and tisanes), a flavorant, a stimulant (e.g., caffeine or guarana), an amino acid (e.g., taurine, theanine, phenylalanine, tyrosine, and tryptophan), and/or a pharmaceutical, nutraceutical, or medicinal ingredient (e.g., a vitamin, such as B6, B12, and C, and/or a cannabinoid, such as tetrahydrocannabinol (THC) or cannabidiol (CBD) and/or melatonin). In some embodiments, two or more active ingredients can be incorporated within the same composition.

The choice of active ingredients and the particular percentages thereof which may be present within the disclosed composition will vary depending upon the desired flavor, texture, and other characteristics of the composition and any product into which the composition is incorporated. Typically, an active ingredient or combination thereof is present in a concentration of at least about 0.001% by weight of the composition, such as in a range from about 0.001% to about 20%. In some embodiments, the active ingredient is present in a concentration from about 0.1% w/w to about 20% by weight, such as, e.g., from about from about 0.1% w/w, about 0.2%, about 0.3%, about 0.4%, about 0.5% about 0.6%, about 0.7%, about 0.8%, or about 0.9%, to about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, or about 20% by weight, based on the total weight of the composition. In some embodiments, the active ingredient is present in a concentration from about 0.1% w/w to about 10% by weight, such as, e.g., from about from about 0.5% w/w to about 10%, from about 1% to about 10%, from about 1% to about 5% by weight, based on the total weight of the composition.

In certain embodiments, a nicotine component may be included in the composition. By "nicotine component" is meant any suitable form of nicotine (e.g., free base or salt) for providing oral absorption of at least a portion of the nicotine present. Typically, the nicotine component is selected from the group consisting of nicotine free base and a nicotine salt. In some embodiments, nicotine is in its free base form, which easily can be adsorbed in for example, a microcrystalline cellulose material to form a microcrystalline cellulose-nicotine carrier complex. See, for example, the discussion of nicotine in free base form in US Pat. App. Pub. No. 2004/0191322 to Hansson, which is incorporated herein by reference. As such, in some embodiments, a composition is provided comprising a nanocellulose-nicotine carrier complex.

In some embodiments, at least a portion of the nicotine can be employed in the form of a salt. Salts of nicotine can be provided using the types of ingredients and techniques set forth in U.S. Pat. No. 2,033,909 to Cox et al. and Perfetti, *Beitrage Tabakforschung Int.*, 12: 43-54 (1983), which are incorporated herein by reference. Further salts are disclosed in, for example, U.S. Pat. No. 9,738,622 to Dull et al., and US Pat. App. Pub. Nos. 2018/0230126 to Dull et al., 2016/0185750 to Dull et al., and 2018/0051002 to Dull et al., each of which is incorporated herein by reference. Additionally, salts of nicotine are available from sources such as Pfaltz and Bauer, Inc. and K&K Laboratories, Division of ICN Biochemicals, Inc. Typically, the nicotine component is selected from the group consisting of nicotine free base, a nicotine salt such as hydrochloride, dihydrochloride, monotartrate, bitartrate, sulfate, salicylate, and nicotine zinc chloride.

In some embodiments, at least a portion of the nicotine can be in the form of a resin complex of nicotine, where nicotine is bound in an ion-exchange resin, such as nicotine polacrilex, which is nicotine bound to, for example, a polymethacrilic acid, such as Amberlite IRP64, Purolite C115HMR, or Doshion P551. See, for example, U.S. Pat. No. 3,901,248 to Lichtneckert et al., which is incorporated herein by reference. Another example is a nicotine-polyacrylic carbomer complex, such as with Carbopol 974P. In some embodiments, nicotine may be present in the form of a nicotine polyacrylic complex.

Typically, the nicotine component (calculated as the free base) when present, is in a concentration of at least about 0.001% by weight of the composition, such as in a range from about 0.001% to about 10%. In some embodiments, the nicotine component is present in a concentration from about 0.1% w/w to about 10% by weight, such as, e.g., from about from about 0.1% w/w, about 0.2%, about 0.3%, about 0.4%, about 0.5% about 0.6%, about 0.7%, about 0.8%, or about 0.9%, to about 1%, about 2%, about 3%, about 4%, about 5%, about 6%, about 7%, about 8%, about 9%, or about 10% by weight, calculated as the free base and based on the total weight of the composition. In some embodiments, the nicotine component is present in a concentration from about 0.1% w/w to about 3% by weight, such as, e.g., from about from about 0.1% w/w to about 2.5%, from about 0.1% to about 2.0%, from about 0.1% to about 1.5%, or from about 0.1% to about 1% by weight, calculated as the free base and based on the total weight of the composition. These ranges can also apply to other active ingredients noted herein.

In some embodiments, the composition of the disclosure can be characterized as completely free or substantially free of nicotine. For example, certain embodiments can be characterized as having less than 0.1% by weight, or less than 0.01% by weight, or less than 0.001% by weight, or 0% by weight of a nicotine component.

Flavorant

In some embodiments, the composition comprises a flavorant. As used herein, a "flavorant" or "flavoring agent" is any flavorful or aromatic substance capable of altering the sensory characteristics associated with the composition and/or with an oral product incorporating such a composition. Examples of sensory characteristics that can be modified by the flavoring agent include taste, mouthfeel, moistness, coolness/heat, and/or fragrance/aroma. Flavoring agents may be natural or synthetic, and the character of the flavors imparted thereby may be described, without limitation, as fresh, sweet, herbal, confectionary, floral, fruity, or spicy. Specific types of flavors include, but are not limited to, vanilla, coffee, chocolate/cocoa, cream, mint, spearmint, menthol, peppermint, wintergreen, eucalyptus, lavender, cardamon, nutmeg, cinnamon, clove, cascarilla, sandalwood, honey, jasmine, ginger, anise, sage, licorice, lemon, orange, apple, peach, lime, cherry, strawberry, trigeminal sensates, terpenes, and any combinations thereof. See also, Leffingwell et al., Tobacco Flavoring for Smoking Products, R. J. Reynolds Tobacco Company (1972), which is incorporated herein by reference. Flavoring agents may comprise components such as terpenes, terpenoids, aldehydes, ketones, esters, and the like. In some embodiments, the flavoring agent is a trigeminal sensate. As used herein, "trigeminal sensate" refers to a flavoring agent which has an effect on the trigeminal nerve, producing sensations including heating, cooling, tingling, and the like. Non-limiting examples of trigeminal sensate flavoring agents include capsaicin, citric acid, menthol, Sichuan buttons, erythritol, and cubebol. Flavorings also may include components that are considered moistening, cooling or smoothening agents, such as eucalyptus. These flavors may be provided neat (i.e., alone) or in a composite, and may be employed as concentrates or flavor packages (e.g., spearmint and menthol, orange and cinnamon; lime, pineapple, and the like). Representative types of components also are set forth in U.S. Pat. No. 5,387,416 to White et al.; U.S. Pat. App. Pub. No. 2005/0244521 to Strickland et al.; and PCT Application Pub. No. WO 05/041699 to Quinter et al., each of which is incorporated herein by reference. In some instances, the flavoring agent may be provided in a spray-dried form or a liquid form.

The amount of flavorant utilized in the composition can vary, but is typically up to about 10 weight percent, and certain embodiments are characterized by a flavoring agent content of at least about 0.1 weight percent, such as about 0.5 to about 10 weight percent, about 1 to about 6 weight percent, or about 2 to about 5 weight percent, based on the total weight of the composition.

In some embodiments, the composition comprises further components, such as fillers, binders, humectants, sweeteners, salts, buffering agents, tobacco materials, and the like. Examples of components suitable for use in the present compositions are described further herein below.

Fillers

Compositions comprising nanocellulose as described herein may include a filler or combination of fillers. Fillers may fulfill multiple functions, such as enhancing certain organoleptic properties such as texture and mouthfeel, enhancing cohesiveness or compressibility of the product, and the like, depending on the product. Generally, the filler is a porous particulate material and is cellulose-based. For example, fillers are any non-tobacco plant material or derivative thereof, including cellulose materials derived from such sources. Examples of cellulosic non-tobacco plant material include cereal grains (e.g., maize, oat, barley, rye, buckwheat, and the like), sugar beet (e.g., FIBREX® brand filler available from International Fiber Corporation), bran fiber, and mixtures thereof. Non-limiting examples of derivatives of non-tobacco plant material include starches (e.g., from potato, wheat, rice, corn), natural cellulose, and modified cellulosic materials. Additional examples of potential fillers include maltodextrin, dextrose, calcium carbonate, calcium phosphate, lactose, mannitol, xylitol, and sorbitol. Combinations of fillers can also be used.

"Starch" as used herein may refer to pure starch from any source, modified starch, or starch derivatives. Starch is present, typically in granular form, in almost all green plants and in various types of plant tissues and organs (e.g., seeds, leaves, rhizomes, roots, tubers, shoots, fruits, grains, and stems). Starch can vary in composition, as well as in granular shape and size. Often, starch from different sources has different chemical and physical characteristics. A specific starch can be selected for inclusion in the composition based on the ability of the starch material to impart a specific organoleptic property to composition. Starches derived from various sources can be used. For example, major sources of starch include cereal grains (e.g., rice, wheat, and maize) and root vegetables (e.g., potatoes and cassava). Other examples of sources of starch include acorns, arrowroot, arracacha, bananas, barley, beans (e.g., favas, lentils, mung beans, peas, chickpeas), breadfruit, buckwheat, canna, chestnuts, colacasia, katakuri, kudzu, malanga, millet, oats, oca, Polynesian arrowroot, sago, sorghum, sweet potato, quinoa, rye, tapioca, taro, tobacco, water chestnuts, and yams. Certain starches are modified starches. A modified starch has undergone one or more structural modifications, often designed to alter its high heat properties. Some starches have been developed by genetic modifications, and are considered to be "modified" starches. Other starches are obtained and subsequently modified. For example, modified starches can be starches that have been subjected to chemical reactions, such as esterification, etherification, oxidation, depolymerization (thinning) by acid catalysis or oxidation in the presence of base, bleaching, transglycosylation and depolymerization (e.g., dextrinization in the presence of a catalyst), cross-linking, enzyme treatment, acetylation, hydroxypropylation, and/or partial hydrolysis. Other starches are modified by heat treatments, such as pregelatinization, dextrinization, and/or cold water swelling processes. Certain modified starches include monostarch phosphate, distarch glycerol, distarch phosphate esterified with sodium trimetaphosphate, phosphate distarch phosphate, acetylated distarch phosphate, starch acetate esterified with acetic anhydride, starch acetate esterified with vinyl acetate, acetylated distarch adipate, acetylated distarch glycerol, hydroxypropyl starch, hydroxypropyl distarch glycerol, and starch sodium octenyl succinate.

In some embodiments, the filler is a cellulose material or cellulose derivative. One particularly suitable filler for use in the compositions described herein is microcrystalline cellulose ("mcc"). The mcc may be synthetic or semi-synthetic, or it may be obtained entirely from natural celluloses. The mcc may be selected from the group consisting of AVICEL© grades PH-100, PH-102, PH-103, PH-105, PH-112, PH-113, PH-200, PH-300, PH-302, VIVACEL© grades 101, 102, 12, 20 and EMOCEL© grades 50M and 90M, and the like, and mixtures thereof. In one embodiment, the composition comprises mcc as a filler.

When present, the amount of filler can vary, but is typically up to about 75 percent by weight of the composition, based on the total weight of the composition. A typical range of filler within the composition can be from about 10 to about 75 percent by total weight of the composition, for example, from about 10, about 15, about 20, about 25, or about 30, to about 35, about 40, about 45, or about 50 weight percent (e.g., about 20 to about 50 weight percent or about 25 to about 45 weight percent). In certain embodiments, the amount of filler is at least about 10 percent by weight, such as at least about 20 percent, or at least about 25 percent, or at least about 30 percent, or at least about 35 percent, or at least about 40 percent, based on the total weight of the composition. In some embodiments, the composition of the disclosure can be characterized as completely free or substantially free of filler. For example, in some embodiments, the traditional role of a filler (e.g., mcc) may be served by the nanocellulose (e.g., CNF, CNC, or bacterial cellulose).

Binders

A binder (or combination of binders) may be employed in certain embodiments, in amounts sufficient to provide the desired physical attributes and physical integrity to the composition comprising the nanocellulose as described herein. Typical binders can be organic or inorganic, or a combination thereof. Representative binders include cellulose derivatives, povidone, sodium alginate, starch-based binders, pectin, carrageenan, pullulan, zein, and the like, and combinations thereof. In some embodiments, the nanocellulose material as described herein may serve as a binder. A binder may be employed in amounts sufficient to provide the desired physical attributes and physical integrity to the composition. The amount of binder utilized in the composition can vary, but is typically up to about 30 weight percent, and certain embodiments are characterized by a binder content of at least about 0.1% by weight, such as about 1 to about 30% by weight, or about 5 to about 10% by weight, based on the total weight of the composition.

In one embodiment, the binder comprises a cellulose derivative. In certain embodiments, the cellulose derivative is a cellulose ether (including carboxyalkyl ethers), meaning a cellulose polymer with the hydrogen of one or more hydroxyl groups in the cellulose structure replaced with an alkyl, hydroxyalkyl, or aryl group. Non-limiting examples of such cellulose derivatives include methylcellulose, hydroxypropylcellulose ("HPC"), hydroxypropylmethylcellulose ("HPMC"), hydroxyethyl cellulose, and carboxymethylcellulose ("CMC"). In one embodiment, the cellulose derivative is one or more of methylcellulose, HPC, HPMC, hydroxyethyl cellulose, and CMC. In one embodiment, the cellulose derivative is HPC. In one embodiment, the cellulose derivative is a combination of HPC and HPMC. In one embodiment, a binder may include a nanocellulose. In some embodiments, the composition comprises from about 1 to about 10% of a cellulose derivative by weight, based on the total weight of the composition, with certain embodiments comprising about 1 to about 5% by weight of cellulose derivative, for example, from about 1%, about 2%, or about 3%, to about 4%, or about 5% by weight of the composition.

In certain embodiments, the binder includes a gum, for example, a natural gum. As used herein, a natural gum refers to polysaccharide materials of natural origin that have binding properties, and which are also useful as a thickening or gelling agents. Representative natural gums derived from plants, which are typically water soluble to some degree, include xanthan gum, guar gum, gum arabic, ghatti gum, gum tragacanth, karaya gum, locust bean gum, gellan gum, and combinations thereof. When present, natural gum binder materials are typically present in an amount of up to about 5% by weight, for example, from about 0.1, about 0.2, about 0.3, about 0.4, about 0.5, about 0.6, about 0.7, about 0.8, about 0.9, or about 1%, to about 2, about 3, about 4, or about 5% by weight, based on the total weight of the composition.

In some embodiments, the composition of the disclosure can be characterized as completely free or substantially free of binder.

Humectants

In certain embodiments, one or more humectants may be employed in the composition. Examples of humectants include, but are not limited to, glycerin, propylene glycol, and the like. Where included, the humectant is typically provided in an amount sufficient to provide desired moisture attributes and physical properties to the composition. Further, in some instances, the humectant may impart desirable flow characteristics to the composition for depositing in a mold, forming a foam or gel, or the like. When present, a humectant will typically make up about 5% or less of the weight of the composition (e.g., from about 0.5 to about 5% by weight). When present, a representative amount of humectant is about 0.1% to about 1% by weight, or about 1% to about 5% by weight, based on the total weight of the composition.

Tobacco Material

In some embodiments, the composition of the present disclosure may include a tobacco material. The tobacco material can vary in species, type, and form. Generally, the tobacco material is obtained from for a harvested plant of the Nicotiana species. Example Nicotiana species include N. tabacum, N. rustica, N. alata, N. arentsii, N. excelsior, N. forgetiana, N. glauca, N. glutinosa, N. gossei, N. kawakamii, N. knightiana, N. langsdorffi, N. otophora, N. setchelli, N. sylvestris, N. tomentosa, N. tomentosiformis, N. undulata, N.×sanderae, N. africana, N. amplexicaulis, N. benavidesii, N. bonariensis, N. debneyi, N. longiflora, N. maritina, N. megalosiphon, N. occidentalis, N. paniculata, N. plumbaginifolia, N. raimondii, N. rosulata, N. simulans, N. stocktonii, N. suaveolens, N. umbratica, N. velutina, N. wigandioides, N. acaulis, N. acuminata, N. attenuata, N. benthamiana, N. cavicola, N. clevelandii, N. cordifolia, N. corymbosa, N. fragrans, N. goodspeedii, N. linearis, N. miersii, N. nudicaulis, N. obtusifolia, N. occidentalis subsp. Hersperis, N. pauciflora, N. petunioides, N. quadrivalvis, N. repanda, N. rotundifolia, N. solanifolia, and N. spegazzinii. Various representative other types of plants from the Nicotiana species are set forth in Goodspeed, The Genus Nicotiana, (Chonica Botanica) (1954); U.S. Pat. No. 4,660,577 to Sensabaugh, Jr. et al.; 5,387,416 to White et al., U.S. Pat. No. 7,025,066 to Lawson et al.; U.S. Pat. No. 7,798,153 to Lawrence, Jr. and 8,186,360 to Marshall et al.; each of which is incorporated herein by reference. Descriptions of various types of tobaccos, growing practices and harvesting practices are set forth in Tobacco Production, Chemistry and Technology, Davis et al. (Eds.) (1999), which is incorporated herein by reference.

Nicotiana species from which suitable tobacco materials can be obtained can be derived using genetic-modification or crossbreeding techniques (e.g., tobacco plants can be genetically engineered or crossbred to increase or decrease production of components, characteristics or attributes). See, for example, the types of genetic modifications of plants set forth in U.S. Pat. No. 5,539,093 to Fitzmaurice et al.; U.S. Pat. No. 5,668,295 to Wahab et al.; U.S. Pat. No. 5,705,624 to Fitzmaurice et al.; U.S. Pat. No. 5,844,119 to Weigl; U.S. Pat. No. 6,730,832 to Dominguez et al.; U.S. Pat. No. 7,173,170 to Liu et al.; U.S. Pat. No. 7,208,659 to Colliver et al. and 7,230,160 to Benning et al.; U.S. Patent Appl. Pub. No. 2006/0236434 to Conkling et al.; and International Patent Appl. Pub. No. WO2008/103935 to Nielsen et al. See, also, the types of tobaccos that are set forth in U.S. Pat. No. 4,660,577 to Sensabaugh, Jr. et al.; 5,387,416 to White et al.; and 6,730,832 to Dominguez et al., each of which is incorporated herein by reference.

The Nicotiana species can, in some embodiments, be selected for the content of various compounds that are present therein. For example, plants can be selected on the basis that those plants produce relatively high quantities of one or more of the compounds desired to be isolated therefrom. In certain embodiments, plants of the Nicotiana species (e.g., Galpao commun tobacco) are specifically grown for their abundance of leaf surface compounds. Tobacco plants can be grown in greenhouses, growth chambers, or outdoors in fields, or grown hydroponically.

Various parts or portions of the plant of the Nicotiana species can be included within a composition as disclosed herein, as disclosed herein. For example, virtually all of the plant (e.g., the whole plant) can be harvested, and employed as such. Alternatively, various parts or pieces of the plant can be harvested or separated for further use after harvest. For example, the flower, leaves, stem, stalk, roots, seeds, and various combinations thereof, can be isolated for further use or treatment. In some embodiments, the tobacco material comprises tobacco leaf (lamina). The composition as disclosed herein can include processed tobacco parts or pieces, cured and aged tobacco in essentially natural lamina and/or stem form, a tobacco extract, extracted tobacco pulp (e.g., using water as a solvent), or a mixture of the foregoing (e.g., a mixture that combines extracted tobacco pulp with granulated cured and aged natural tobacco lamina).

In certain embodiments, the tobacco material comprises solid tobacco material selected from the group consisting of lamina and stems. The tobacco that is used for the mixture most preferably includes tobacco lamina, or a tobacco lamina and stem mixture (of which at least a portion is smoke-treated). Portions of the tobaccos within the mixture may have processed forms, such as processed tobacco stems (e.g., cut-rolled stems, cut-rolled-expanded stems or cut-puffed stems), or volume expanded tobacco (e.g., puffed tobacco, such as dry ice expanded tobacco (DIET)). See, for example, the tobacco expansion processes set forth in U.S. Pat. No. 4,340,073 to de la Burde et al.; U.S. Pat. No. 5,259,403 to Guy et al.; U.S. Pat. No. 5,908,032 to Poindexter, et al.; and 7,556,047 to Poindexter, et al., all of which are incorporated by reference. In addition, the composition optionally may incorporate tobacco that has been fermented. See, also, the types of tobacco processing techniques set forth in International Patent Application Publication No. WO2005/063060 to Atchley et al., which is incorporated herein by reference.

Where used within a composition as disclosed herein, the tobacco material is typically used in a form that can be described as particulate (i.e., shredded, ground, granulated, or powder form). The tobacco plant or portion thereof can be separated into individual parts or pieces (e.g., the leaves can be removed from the stems, and/or the stems and leaves can be removed from the stalk). The harvested plant or individual parts or pieces can be further subdivided into parts or pieces (e.g., the leaves can be shredded, cut, comminuted, pulverized, milled or ground into pieces or parts that can be characterized as filler-type pieces, granules, particulates or fine powders).

The manner by which the tobacco material is provided in a finely divided or powder type of form may vary. Preferably, plant parts or pieces are comminuted, ground or pulverized into a particulate form using equipment and techniques for grinding, milling, or the like. Most preferably, the plant material is relatively dry in form during grinding or milling, using equipment such as hammer mills, cutter heads, air control mills, or the like. For example, tobacco parts or pieces may be ground or milled when the moisture content thereof is less than about 15 weight percent or less than about 5 weight percent. The plant, or parts thereof, can be subjected to external forces or pressure (e.g., by being pressed or subjected to roll treatment). When carrying out such processing conditions, the plant or portion thereof can have a moisture content that approximates its natural moisture content (e.g., its moisture content immediately upon harvest), a moisture content achieved by adding moisture to the plant or portion thereof, or a moisture content that results from the drying of the plant or portion thereof. For example, powdered, pulverized, ground or milled pieces of plants or portions thereof can have moisture contents of less than about 25 weight percent, often less than about 20 weight percent, and frequently less than about 15 weight percent. Most preferably, the tobacco material is employed in the form of parts or pieces that have an average particle size between 1.4 millimeters and 250 microns. In some instances, the tobacco particles may be sized to pass through a screen mesh to obtain the particle size range required. If desired, air classification equipment may be used to ensure that small sized tobacco particles of the desired sizes, or range of sizes, may be collected. If desired, differently sized pieces of granulated tobacco may be mixed together.

For the preparation of compositions, it is typical for a harvested plant of the *Nicotiana* species to be subjected to a curing process. The tobacco materials incorporated within the composition as disclosed herein are those that have been appropriately cured and/or aged. Descriptions of various types of curing processes for various types of tobaccos are set forth in *Tobacco Production, Chemistry and Technology*, Davis et al. (Eds.) (1999). Examples of techniques and conditions for curing flue-cured tobacco are set forth in Nestor et al., *Beitrage Tabakforsch. Int.*, 20, 467-475 (2003) and U.S. Pat. No. 6,895,974 to Peele, which are each incorporated herein by reference. Representative techniques and conditions for air curing tobacco are set forth in U.S. Pat. No. 7,650,892 to Groves et al.; Roton et al., *Beitrage Tabakforsch. Int.*, 21, 305-320 (2005) and Staaf et al., *Beitrage Tabakforsch. Int.*, 21, 321-330 (2005), which are each incorporated herein by reference. Certain types of tobaccos can be subjected to alternative types of curing processes, such as fire curing or sun curing.

In certain embodiments, tobacco materials that can be employed include flue-cured or Virginia (e.g., K326), burley, sun-cured (e.g., Indian Kurnool and Oriental tobaccos, including Katerini, Prelip, Komotini, Xanthi and Yambol tobaccos), Maryland, dark, dark-fired, dark air cured (e.g., Madole, Passanda, Cubano, Jatin and Bezuki tobaccos), light air cured (e.g., North Wisconsin and Galpao tobaccos), Indian air cured, Red Russian and Rustica tobaccos, as well as various other rare or specialty tobaccos and various blends of any of the foregoing tobaccos.

The tobacco material may also have a so-called "blended" form. For example, the tobacco material may include a mixture of parts or pieces of flue-cured, burley (e.g., Malawi burley tobacco) and Oriental tobaccos (e.g., as tobacco composed of, or derived from, tobacco lamina, or a mixture of tobacco lamina and tobacco stem). For example, a representative blend may incorporate about 30 to about 70 parts burley tobacco (e.g., lamina, or lamina and stem), and about 30 to about 70 parts flue cured tobacco (e.g., stem, lamina, or lamina and stem) on a dry weight basis. Other example tobacco blends incorporate about 75 parts flue-cured tobacco, about 15 parts burley tobacco, and about 10 parts Oriental tobacco; or about 65 parts flue-cured tobacco, about 25 parts burley tobacco, and about 10 parts Oriental tobacco; or about 65 parts flue-cured tobacco, about 10 parts burley tobacco, and about 25 parts Oriental tobacco; on a dry weight basis. Other example tobacco blends incorporate about 20 to about 30 parts Oriental tobacco and about 70 to about 80 parts flue-cured tobacco on a dry weight basis.

Tobacco materials used in the present disclosure can be subjected to, for example, fermentation, bleaching, and the like. If desired, the tobacco materials can be, for example, irradiated, pasteurized, or otherwise subjected to controlled heat treatment. Such treatment processes are detailed, for example, in U.S. Pat. No. 8,061,362 to Mua et al., which is incorporated herein by reference. In certain embodiments, tobacco materials can be treated with water and an additive capable of inhibiting reaction of asparagine to form acrylamide upon heating of the tobacco material (e.g., an additive selected from the group consisting of lysine, glycine, histidine, alanine, methionine, cysteine, glutamic acid, aspartic acid, proline, phenylalanine, valine, arginine, compositions incorporating di- and trivalent cations, asparaginase, certain non-reducing saccharides, certain reducing agents, phenolic compounds, certain compounds having at least one free thiol group or functionality, oxidizing agents, oxidation catalysts, natural plant extracts (e.g., rosemary extract), and combinations thereof). See, for example, the types of treatment processes described in U.S. Pat. Nos. 8,434,496, 8,944,072, and 8,991,403 to Chen et al., which are all incorporated herein by reference. In certain embodiments, this type of treatment is useful where the original tobacco material is subjected to heat in the processes previously described.

In various embodiments, the tobacco material can be treated to extract a soluble component of the tobacco material therefrom. "Tobacco extract" as used herein refers to the isolated components of a tobacco material that are extracted from solid tobacco pulp by a solvent that is brought into contact with the tobacco material in an extraction process. Various extraction techniques of tobacco materials can be used to provide a tobacco extract and tobacco solid material. See, for example, the extraction processes described in U.S. Pat. Appl. Pub. No. 2011/0247640 to Beeson et al., which is incorporated herein by reference. Other example techniques for extracting components of tobacco are described in U.S. Pat. No. 4,144,895 to Fiore; U.S. Pat. No. 4,150,677 to Osborne, Jr. et al.; 4,267,847 to Reid; U.S. Pat. No. 4,289,147 to Wildman et al.; U.S. Pat. No. 4,351,346 to Brummer et al.; U.S. Pat. No. 4,359,059 to Brummer et al.; U.S. Pat. No. 4,506,682 to Muller; U.S. Pat. No. 4,589,428 to Keritsis; U.S. Pat. No. 4,605,016 to Soga et al.; U.S. Pat. No. 4,716,911 to Poulose et al.; U.S. Pat. No. 4,727,889 to Niven, Jr. et al.; 4,887,618 to Bernasek et al.; U.S. Pat. No. 4,941,484 to Clapp et al.; U.S. Pat. No. 4,967,771 to Fagg et al.; U.S. Pat. No. 4,986,286 to Roberts et al.; U.S. Pat. No. 5,005,593 to Fagg et al.; U.S. Pat. No. 5,018,540 to Grubbs et al.; U.S. Pat. No. 5,060,669 to White et al.; U.S. Pat. No. 5,065,775 to Fagg; U.S. Pat. No. 5,074,319 to White et al.; U.S. Pat. No. 5,099,862 to White et al.; U.S. Pat. No. 5,121,757 to White et al.; U.S. Pat. No. 5,131,414 to Fagg; U.S. Pat. No. 5,131,415 to Munoz et al.; U.S. Pat. No. 5,148,819 to Fagg; U.S. Pat. No. 5,197,494 to Kramer; U.S. Pat. No. 5,230,354 to Smith et al.; U.S. Pat. No. 5,234,008 to Fagg; U.S. Pat. No. 5,243,999 to Smith; U.S. Pat. No. 5,301,694 to Raymond et al.; U.S. Pat. No. 5,318,050 to Gonzalez-Parra et al.; U.S. Pat. No. 5,343,879 to Teague; U.S. Pat. No. 5,360,022 to Newton; U.S. Pat. No. 5,435,325 to Clapp et al.; U.S. Pat. No. 5,445,169 to Brinkley et al.; U.S. Pat. No. 6,131,584 to Lauterbach; U.S. Pat. No. 6,298,859 to Kierulff et al.; U.S. Pat. No. 6,772,767 to Mua et al.; and 7,337,782 to Thompson, all of which are incorporated by reference herein.

In some embodiments, the type of tobacco material is selected such that it is initially visually lighter in color than other tobacco materials to some degree (e.g., whitened or bleached). Tobacco pulp can be whitened in certain embodiments according to any means known in the art.

Typical inclusion ranges for tobacco materials can vary depending on the nature and type of the tobacco material, and the intended effect on the composition, with an example range of up to about 30% by weight (or up to about 20% by weight or up to about 10% by weight or up to about 5% by weight), based on total weight of the composition (e.g., about 0.1 to about 15% by weight). In some embodiments, the composition can be characterized as completely free or substantially free of tobacco material (other than purified nicotine as a possible active ingredient). In some embodiments, such products are described as having no tobacco material (other than purified nicotine as a possible active ingredient) intentionally added thereto. For example, certain embodiments can be characterized as having less than 1% by weight, or less than 0.5% by weight, or less than 0.1% by weight of tobacco material, or 0% by weight of tobacco material.

Salts

In some embodiments, the composition according to the disclosure comprises a salt (e.g., an alkali metal salt), typically employed in an amount sufficient to provide desired sensory attributes to the composition. Non-limiting examples of suitable salts include sodium chloride, potassium chloride, ammonium chloride, flour salt, sodium acetate, sodium citrate, and the like. When present, a representative amount of salt is about 0.5 percent by weight or more, about 1.0 percent by weight or more, or about 1.5 percent by weight or more, but will typically make up about 10 percent or less, or about 7.5 percent or less, or about 5 percent or less (e.g., from about 0.5 to about 5 percent by weight) of the total weight of the composition Sweeteners In order to improve the sensory properties of the composition according to the disclosure, one or more sweeteners may be added. The sweeteners can be any sweetener or combination of sweeteners, in natural or artificial form, or as a combination of natural and artificial sweeteners. Examples of natural sweeteners include fructose, sucrose, glucose, maltose, mannose, galactose, lactose, stevia, honey, and the like. Examples of artificial sweeteners include sucralose, isomaltulose, maltodextrin, saccharin, aspartame, acesulfame K, neotame and the like. In some embodiments, the sweetener comprises one or more sugar alcohols. Sugar alcohols are polyols derived from monosaccharides or disaccharides that have a partially or fully hydrogenated form. Sugar alcohols have, for example, about 4 to about 20 carbon atoms and include erythritol, arabitol, ribitol, isomalt, maltitol, dulcitol, iditol, mannitol, xylitol, lactitol, sorbitol, and combinations thereof (e.g., hydrogenated starch hydrolysates).

When present, a sweetener or combination of sweeteners may make up from about 0.1 to about 20 percent or more by weight of the of the composition, for example, from about 0.1 to about 1%, from about 1 to about 5%, from about 5 to about 10%, or from about 10 to about 20% by weight, based on the total weight of the composition.

Buffering Agents

In certain embodiments, the composition of the present disclosure can comprise pH adjusters or buffering agents. Examples of pH adjusters and buffering agents that can be used include, but are not limited to, metal hydroxides (e.g., alkali metal hydroxides such as sodium hydroxide and potassium hydroxide), and other alkali metal buffers such as metal carbonates (e.g., potassium carbonate or sodium carbonate), or metal bicarbonates such as sodium bicarbonate, and the like. Where present, the buffering agent is typically present in an amount less than about 5 percent based on the weight of the composition, for example, from about 0.5% to about 5%, such as, e.g., from about 0.75% to about 4%, from about 0.75% to about 3%, or from about 1% to about 2% by weight, based on the total weight of the composition. Non-limiting examples of suitable buffers include alkali metals acetates, glycinates, phosphates, glycerophosphates, citrates, carbonates, hydrogen carbonates, borates, or mixtures thereof.

Colorants

A colorant may be employed in amounts sufficient to provide the desired physical attributes to the composition according to the present disclosure. Examples of colorants include various dyes and pigments, such as caramel coloring and titanium dioxide. The amount of colorant utilized in the composition can vary, but when present is typically up to about 3 weight percent, such as from about 0.1%, about 0.5%, or about 1%, to about 3% by weight, based on the total weight of the composition.

Oral Care Ingredients

Oral care ingredients provide the ability to inhibit tooth decay or loss, inhibit gum disease, relieve mouth pain, whiten teeth, or otherwise inhibit tooth staining, elicit salivary stimulation, inhibit breath malodor, freshen breath, or the like. For example, effective amounts of ingredients such as thyme oil, eucalyptus oil and zinc (e.g., such as the ingredients of formulations commercially available as ZYTEX® from Discus Dental) can be incorporated into the composition as disclosed herein. Other examples of ingredients that can be incorporated in desired effective amounts within the present composition can include those that are incorporated within the types of oral care compositions set forth in Takahashi et al., Oral Microbiology and Immunology, 19(1), 61-64 (2004); U.S. Pat. No. 6,083,527 to Thistle; and U.S. Pat. Appl. Pub. Nos. 2006/0210488 to Jakubowski and 2006/02228308 to Cummins et al. Other exemplary ingredients include those contained in formulations marketed as MALTISORB® by Roquette and DENTIZYME® by NatraRx. When present, a representative amount of oral care additive is at least about 1 percent, often at least about 3 percent, and frequently at least about 5 percent of the total weight of the composition. The amount of oral care additive will not typically exceed about 30 percent, often will not exceed about 25 percent, and frequently will not exceed about 20 percent, of the total weight of the composition.

Other Additives

Other additives can be included in the composition as disclosed. For example, the composition can be processed, blended, formulated, combined, and/or mixed with other materials or ingredients. The additives can be artificial, or can be obtained or derived from herbal or biological sources. Examples of further types of additives include thickening or gelling agents (e.g., fish gelatin), preservatives (e.g., potassium sorbate and the like), disintegration aids, or combinations thereof. See, for example, those representative components, combination of components, relative amounts of those components, and manners and methods for employing those components, set forth in U.S. Pat. No. 9,237,769 to Mua et al., U.S. Pat. No. 7,861,728 to Holton, Jr. et al., U.S. Pat. App. Pub. No. 2010/0291245 to Gao et al., and U.S. Pat. App. Pub. No. 2007/0062549 to Holton, Jr. et al., each of which is incorporated herein by reference. Typical inclusion ranges for such additional additives can vary depending on the nature and function of the additive and the intended effect on the final composition, with an example range of up to about 10% by weight, (e.g., about 0.1 to about 5% by weight) based on total weight of the composition.

The aforementioned additives can be employed together (e.g., as additive formulations) or separately (e.g., individual additive components can be added at different stages involved in the preparation of the final product). Furthermore, the aforementioned types of additives may be encapsulated as provided in the final product or composition. Exemplary encapsulated additives are described, for example, in International Patent Application Publication No. WO2010/132444 to Atchley, which is incorporated by reference herein.

Fleece Material Comprising Nanocellulose

In another aspect is provided a fleece material comprising a nonwoven fabric and nanocellulose as disclosed herein.

The term "nonwoven" is used herein in reference to fabric (e.g., webs, mats, batts, or sheets) in which fibers are aligned in an undefined or random orientation. In various embodiments, the nonwoven fabric can be made in a spunlaid or spunmelt process, which includes both spunbond and meltblown processes, wherein such processes are understood to typically entail melting, extruding, collecting and bonding thermoplastic polymer materials to form a fibrous nonwoven web. Spunlaid nonwoven webs can be formed in a continuous process. Fibers can be spun and then directly dispersed into a web by deflectors or can be directed with air streams, for example.

Spunbonding typically involves melt spinning, wherein a polymer is melted to a liquid state and forced through small orifices into cool air, such that the polymer strands solidify according to the shape of the orifices. The fiber bundles thus produced are then drawn, i.e., mechanically stretched (e.g., by a factor of 2-5) to orient the fibers. A nonwoven web is then formed by depositing the drawn fibers onto a moving belt. General spunbonding processes are described, for example, in U.S. Pat. No. 4,340,563 to Appel et al., U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartmann, and 3,542,615 to Dobo et al., which are all incorporated herein by reference.

Meltblowing is a process wherein a polymer (or polymers) is melted to a liquid state and extruded through a linear die containing numerous (e.g., several hundred or more) small orifices. As the polymer is extruded, streams of hot air are rapidly blown at the polymer, rapidly stretching and/or attenuating the extruded polymer streams to form extremely fine filaments. The air streams typically stretch or attenuate the molten polymer by many orders of magnitude. The stretched polymer fibers are collected as a randomly entangled, self-bonded nonwoven web. The technique of meltblowing is known in the art and is discussed in various patents, for example, U.S. Pat. No. 3,849,241 to Butin, U.S. Pat. No. 3,987,185 to Buntin et al., U.S. Pat. No. 3,972,759 to Buntin, and 4,622,259 to McAmish et al., each of which is herein incorporated by reference in its entirety.

The nonwoven fabric (e.g., spunbond or meltblown web) can be formed using a thermoplastic polymer. The thermoplastic polymer can exhibit a melting point in a relatively low range to facilitate heat sealing of the pouch material. For example, the thermoplastic polymer fiber can typically have a melting point of about 200° C. or less, about 160° C. or less, about 150° C. or less, about 140° C. or less, or about 120° C. or less. Example thermoplastic polymers include various polyolefin and polyester materials. Advantageously, the thermoplastic polymer of the heat sealable fibers can be a biodegradable polymer, such as an aliphatic polyester. Exemplary aliphatic polyesters include polyglycolic acid (PGA), polylactic acid (PLA) (e.g., poly(L-lactic acid) or poly(DL-lactic acid)), polyhydroxyalkanoates (PHAs) such as polyhydroxypropionate, polyhydroxyvalerate, polyhydroxybutyrate, polyhydroxyhexanoate, and polyhydroxyoctanoate, polycaprolactone (PCL), polybutylene succinate, polybutylene succinate adipate, and copolymers thereof (e.g., polyhydroxybutyrate-co-hydroxyvalerate (PHBV)). Specific examples of commercially available PLA fibers include Ecodear® from Toray of Japan; Ingeo™ based PLA fibers from Fiber Innovations Technology, USA; and PLA fibers from Trevira GmbH. PLA and PHA materials can be sourced from a variety of plant materials, including tobacco.

In certain embodiments, the thermoplastic polymer can comprise plasticized cellulose acetate and/or calcium alginate.

In certain embodiments, the nonwoven fabric may include additional fiber types blended with the above-noted thermoplastic polymer fibers. Suitable fibers include those made of wool, cotton, regenerated cellulose, cellulose acetate, cellulose triacetate, cellulose nitrate, ethyl cellulose, cellulose acetate propionate, cellulose acetate butyrate, hydroxypropyl cellulose, methyl hydroxypropyl cellulose, protein fibers, and the like. See also, the fiber types set forth in U.S. Pat. Appl. Pub. No. 2014/0083438 to Sebastian et al., which is incorporated by reference herein.

Regenerated cellulose fibers are typically prepared by extracting non-cellulosic compounds from wood, contacting the extracted wood with caustic soda, followed by carbon disulfide and then by sodium hydroxide, giving a viscous solution. The solution is subsequently forced through spinneret heads to create viscous threads of regenerated fibers. Exemplary methods for the preparation of regenerated cellulose are provided in U.S. Pat. No. 4,237,274 to Leoni et al; U.S. Pat. No. 4,268,666 to Baldini et al; U.S. Pat. No. 4,252,766 to Baldini et al.; U.S. Pat. No. 4,388,256 to Ishida et al.; U.S. Pat. No. 4,535,028 to Yokogi et al.; U.S. Pat. No. 5,441,689 to Laity; U.S. Pat. No. 5,997,790 to Vos et al.; and U.S. Pat. No. 8,177,938 to Sumnicht, which are incorporated herein by reference. The manner in which the regenerated cellulose is made is not limiting, and can include, for example, both the rayon and the TENCEL processes. Various suppliers of regenerated cellulose are known, including Lenzing (Austria), Cordenka (Germany), Aditya Birla (India), and Daicel (Japan).

The fibers used in the nonwoven fabric according to the present disclosure can vary, and include fibers having any type of cross-section including, but not limited to, circular, rectangular, square, oval, triangular, and multilobal. In certain embodiments, the fibers can have one or more void spaces, wherein the void spaces can have, for example, circular, rectangular, square, oval, triangular, or multilobal cross-sections.

The physical parameters of the fibers present in the nonwoven fabric can vary. For example, the fibers used in the nonwoven fabric can have varying size (e.g., length, denier per filament (dpf)) and crimp characteristics. As used herein, denier refers to a unit of measure for the linear mass density of fibers, and is the mass in grams per 9000 meters of the fiber. Denier per filament (dpf) is the total denier divided by the quantity of uniform filaments. In some embodiments, fibers used in the nonwoven fabric can be nano fibers, sub-micron fibers, and/or micron-sized fibers. In certain embodiments, fibers useful herein can measure about 1.5 dpf to about 2.0 dpf, or about 1.6 dpf to about 1.90 dpf. In various embodiments, each fiber can measure about 4-10 crimps per cm, or about 5-8 crimps per cm. The fibers can be in staple form in certain embodiments, but advantageously, the fibers of the nonwoven fabric are in the form of continuous filaments.

The means of producing the nonwoven fabric can vary. Web formation can be accomplished by any means known in the art. As mentioned above, in various embodiments of the present disclosure, the nonwoven web can be produced by a spunbond process and or a meltblown process.

The nonwoven web can have varying thicknesses, porosities and other parameters. The nonwoven web can be formed such that the fiber orientation and porosity of the pouched product formed therefrom can retain the composition that in some embodiments is enclosed within the pouch, but can also allow the components (e.g., active ingredient and flavor) of the composition to be enjoyed by the consumer. For example, the spunmelt nonwoven fabric can have a basis weight of about 18 grams per square meter (gsm) to about 80 gsm, or about 20 gsm to about 60 gsm, or about 22 gsm to about 30 gsm, for example. Basis weight of a fabric can be measured using ASTM D3776/D3776M-09a(2013) (Standard Test Methods for Mass Per Unit Area (Weight) of Fabric), for example. In various embodiments, the spunmelt nonwoven fabric can have a thickness of about 120 microns to about 300 microns, or about 130 microns to about 200 microns. In a preferred embodiment, the spunmelt nonwoven fabric can have a thickness of about 160 microns, for example. The spunmelt nonwoven fabric can have a dry tensile (machine direction) strength of about 750 N/m to about 950 N/m, or about 825 N/m to about 875 N/m, for example. The spunmelt nonwoven fabric can have a dry tensile (cross direction) strength of about 200 N/m to about 300 N/m, or about 220 N/m to about 260 N/m, for example. Dry tensile strength can be measured by, for example, ISO 1924-2:2008 (Paper and board—Determination of tensile properties—Part 2: Constant rate of elongation method (20 mm/min)). The spunmelt nonwoven fabric can have a dry elongation (machine direction) of about 8% to about 20%, or about 10% to about 16%, for example. The spunmelt nonwoven fabric can have a dry elongation (cross direction) of about 10% to about 20%, or about 14% to about 18%, for example. Elongation and breaking strength of textile fabrics can be measured using ASTM D5034-09(2013) (Standard Test Method for Breaking Strength and Elongation of Textile Fabrics (Grab Test)), for example.

In some embodiments, the nanocellulose in the fleece material comprises cellulose nanofibrils (CNF) having a diameter and length, wherein the diameter is from about 1 to about 100 nm, and the length is from about 1 to about 10 micrometers. In some embodiments, the nanocellulose in the nonwoven fabric comprises cellulose nanocrystals (CNC) having a diameter and length, wherein the diameter is from about 5 to about 20 nm, and the length is from about 50 to about 400 nanometers. In some embodiments, the nanocellulose in the nonwoven fabric comprises bacterial cellulose.

The quantity of nanocellulose (e.g., CNF, CNC, or bacterial cellulose) present in the fleece material may vary. In some embodiments, the fleece material comprises at least about 10% by weight of the nanocellulose. For example, the fleece material may comprise from about 10%, about 20%, about 30%, about 40%, or about 50%, to about 60%, about 70%, about 80%, about 90%, about 95%, or about 99% by weight of the nanocellulose, based on the total weight of the fleece material.

In some embodiments, the nanocellulose in the fleece material has been hydrophobically modified as disclosed herein above.

In some embodiments, the fleece further comprises an active ingredient as disclosed herein, disposed on or absorbed in the fleece material. In some embodiments, the fleece further comprises a flavoring agent. The active ingredient, the flavoring agent, or both, when present, may be combined with the nanocellulose prior to preparation of the fleece material, or may be added to the fleece material at a later stage.

Configured for Oral Use

The composition as described herein is configured for oral use. The term "configured for oral use" as used herein means that the composition is provided in a form such that during use, saliva in the mouth of the user causes one or more of the components of the composition (e.g., flavoring agents and/or active ingredients) to pass into the mouth of the user. In certain embodiments, the composition is adapted to deliver components to a user through mucous membranes in the user's mouth, the user's digestive system, or both, and, in some instances, said component is an active ingredient that can be absorbed through the mucous membranes in the mouth or absorbed through the digestive tract when the product is used.

Compositions as described herein may take various forms, including foams, gels, pastilles, gums, lozenges, powders, and pouches. Gels can be soft or hard. Certain products configured for oral use are in the form of pastilles. As used herein, the term "pastille" refers to a dissolvable oral product made by solidifying a liquid or gel composition so that the final product is a somewhat hardened solid gel. The rigidity of the gel is highly variable. Certain products of the disclosure are in the form of solids. Certain products can exhibit, for example, one or more of the following characteristics: crispy, granular, chewy, syrupy, pasty, fluffy, smooth, and/or creamy. In certain embodiments, the desired textural property can be selected from the group consisting of adhesiveness, cohesiveness, density, dryness, fracturability, graininess, gumminess, hardness, heaviness, moisture absorption, moisture release, mouthcoating, roughness, slipperiness, smoothness, viscosity, wetness, and combinations thereof.

The composition of the present disclosure may be dissolvable. As used herein, the terms "dissolve," "dissolving," and "dissolvable" refer to compositions having aqueous-soluble components that interact with moisture in the oral cavity and enter into solution, thereby causing gradual consumption of the product. According to one aspect, the dissolvable product is capable of lasting in the user's mouth for a given period of time until it completely dissolves. Dissolution rates can vary over a wide range, from about 1 minute or less to about 60 minutes. For example, fast release compositions typically dissolve and/or release the active substance in about 2 minutes or less, often about 1 minute or less (e.g., about 50 seconds or less, about 40 seconds or less, about 30 seconds or less, or about 20 seconds or less). Dissolution can occur by any means, such as melting, mechanical disruption (e.g., chewing), enzymatic or other chemical degradation, or by disruption of the interaction between the components of the composition. In some embodiments, the product can be meltable as discussed, for example, in US Patent App. Pub. No. 2012/0037175 to Cantrell et al. In other embodiments, the products do not dissolve during the product's residence in the user's mouth.

In one embodiment, the product of the present disclosure is in the form of a composition as described herein, disposed within a moisture-permeable container (e.g., a water-permeable pouch). Such compositions in the water-permeable pouch format are typically used by placing one pouch containing the composition in the mouth of a human subject/user. Generally, the pouch is placed somewhere in the oral cavity of the user, for example under the lips, in the same way as moist snuff products are generally used. The pouch preferably is not chewed or swallowed. Exposure to saliva then causes some of the components of the composition therein (e.g., flavoring agents and/or active ingredients) to pass through e.g., the water-permeable pouch and provide the user with flavor and satisfaction, and the user is not required to spit out any portion of the composition. After about 10 minutes to about 60 minutes, typically about 15 minutes to about 45 minutes, of use/enjoyment, substantial amounts of the composition have been absorbed through oral mucosa of the human subject and the pouch may be removed from the mouth of the human subject for disposal.

Accordingly, in certain embodiments, the composition as disclosed herein and any other components noted above are combined within a moisture-permeable packet or pouch that acts as a container for use of the composition to provide a pouched product configured for oral use. Certain embodiments of the disclosure will be described with reference to FIG. 1 of the accompanying drawing, and these described embodiments involve snus-type products having an outer pouch and containing a composition as described herein. As explained in greater detail below, such embodiments are provided by way of example only, and the pouched products of the present disclosure can include the composition in other forms. The composition/construction of such packets or pouches, such as the container pouch 102 in the embodiment illustrated in FIG. 1 may be varied. Referring to FIG. 1, there is shown a first embodiment of a pouched product 100. The pouched product 100 includes a moisture-permeable container in the form of a pouch 102, which contains a material 104 comprising a composition as described herein.

Suitable packets, pouches or containers of the type used for the manufacture of smokeless tobacco products are available under the tradenames CatchDry, Ettan, General, Granit, Goteborgs Rape, Grovsnus White, Metropol Kaktus, Mocca Anis, Mocca Mint, Mocca Wintergreen, Kicks, Probe, Prince, Skruf and TreAnkrare. The composition may be contained in pouches and packaged, in a manner and using the types of components used for the manufacture of conventional snus types of products. The pouch provides a liquid-permeable container of a type that may be considered to be similar in character to the mesh-like type of material that is used for the construction of a tea bag. Components of the composition readily diffuse through the pouch and into the mouth of the user.

Non-limiting examples of suitable types of pouches are set forth in, for example, U.S. Pat. No. 5,167,244 to Kjerstad and 8,931,493 to Sebastian et al.; as well as U.S. Patent App. Pub. Nos. 2016/0000140 to Sebastian et al.; 2016/0073689 to Sebastian et al.; 2016/0157515 to Chapman et al.; and 2016/0192703 to Sebastian et al., each of which is incorporated herein by reference. Pouches can be provided as individual pouches, or a plurality of pouches (e.g., 2, 4, 5, 10, 12, 15, 20, 25 or 30 pouches) can be connected or linked together (e.g., in an end-to-end manner) such that a single pouch or individual portion can be readily removed for use from a one-piece strand or matrix of pouches.

An example pouch may be manufactured from materials, and in such a manner, such that during use by the user, the pouch undergoes a controlled dispersion or dissolution. Such pouch materials may have the form of a mesh, screen, perforated paper, permeable fabric, or the like. For example, pouch material manufactured from a mesh-like form of rice paper, or perforated rice paper, may dissolve in the mouth of the user. As a result, the pouch and composition each may undergo complete dispersion within the mouth of the user during normal conditions of use, and hence the pouch and composition both may be ingested by the user. Other examples of pouch materials may be manufactured using water dispersible film forming materials (e.g., binding agents such as alginates, carboxymethylcellulose, xanthan gum, pullulan, and the like), as well as those materials in combination with materials such as ground cellulosics (e.g., fine particle size wood pulp). Preferred pouch materials, though water dispersible or dissolvable, may be designed and manufactured such that under conditions of normal use, a significant amount of the composition contents permeate through the pouch material prior to the time that the pouch undergoes loss of its physical integrity. If desired, flavoring ingredients, disintegration aids, and other desired components, may be incorporated within, or applied to, the pouch material.

The amount of composition contained within each product unit, for example, a pouch, may vary. In some embodiments, the weight of the composition within each pouch is at least about 50 mg, for example, from about 50 mg to about 1 gram, from about 100 to 800 about mg, or from about 200 to about 700 mg. In some smaller embodiments, the weight of the composition within each pouch may be from about 100 to about 300 mg. For a larger embodiment, the weight of the material within each pouch may be from about 300 mg to about 700 mg. If desired, other components can be contained within each pouch. For example, at least one flavored strip, piece or sheet of flavored water dispersible or water soluble material (e.g., a breath-freshening edible film type of material) may be disposed within each pouch along with or without at least one capsule. Such strips or sheets may be folded or crumpled in order to be readily incorporated within the pouch. See, for example, the types of materials and technologies set forth in U.S. Pat. No. 6,887, 307 to Scott et al. and 6,923,981 to Leung et al.; and The EFSA Journal (2004) 85, 1-32; which are incorporated herein by reference.

Alternatively, or in addition, the pouch material may comprise a fleece material comprising nanocellulose as disclosed herein. In some embodiments, the fleece material may comprise an active ingredient, a flavor, or both, each as described herein, disposed in or on the fleece material (e.g., impregnated in the fleece material or the nanocellulose portion of the fleece material). When present in the fleece material, the active ingredient, the flavor, or both may be the same as that present in the composition, or may be different.

A pouched product as described herein can be packaged within any suitable inner packaging material and/or outer container. See also, for example, the various types of containers for smokeless types of products that are set forth in U.S. Pat. No. 7,014,039 to Henson et al.; U.S. Pat. No. 7,537,110 to Kutsch et al.; U.S. Pat. No. 7,584,843 to Kutsch et al.; U.S. Pat. No. 8,397,945 to Gelardi et al., D592,956 to Thiellier; D594,154 to Patel et al.; and D625,178 to Bailey et al.; U.S. Pat. App. Pub. Nos. 2008/0173317 to Robinson et al.; 2009/0014343 to Clark et al.; 2009/0014450 to Bjorkholm; 2009/0250360 to Bellamah et al.; 2009/0266837 to Gelardi et al.; 2009/0223989 to Gelardi; 2009/0230003 to Thiellier; 2010/0084424 to Gelardi; and 2010/0133140 to Bailey et al; 2010/0264157 to Bailey et al.; and 2011/0168712 to Bailey et al. which are incorporated herein by reference.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A composition configured for oral use and enclosed within a water-permeable pouch, the composition comprising cellulose nanocrystals having a diameter and length, wherein the diameter is from about 5 to about 20 nm, and the length is from about 50 to about 400 nanometers, wherein the cellulose nanocrystals have been chemically modified with acetic anhydride, hexamethyl disilazane, or hydroxyethylmethacrylate, and wherein:
  at least one active ingredient is adsorbed in the cellulose nanocrystals, the at least one active ingredient selected from the group consisting of botanical materials, stimulants, amino acids, vitamins, antioxidants, nicotine components, cannabinoids, pharmaceutical agents, nutraceuticals and combinations thereof, and
  the water-permeable pouch comprises a nonwoven fabric and nanocellulose fibers, the nanocellulose fibers having a flavoring agent adsorbed therein.

2. The composition of claim 1, wherein the nanocellulose fibers comprise cellulose nanofibrils having a diameter and length, wherein the diameter is from about 1 to about 100 nm, and the length is from about 1 to about 10 micrometers.

3. The composition of claim 1, wherein the cellulose nanocrystals, the nanocellulose fibers, or both comprise bacterial cellulose.

4. The composition of claim 1, wherein the cellulose nanocrystals are present in an amount of about 10% by weight or higher, the active agent is present in an amount of about 0.1% by weight or higher, and the composition further comprises water in an amount of about 5% by weight or higher, each of the foregoing weights being based on the total weight of the composition.

5. The composition of claim 4, further comprising one or more salts, one or more organic acids, one or more sweeteners, one or more binding agents, one or more humectants, one or more gums, a tobacco material, or combinations thereof.

6. A fleece material comprising a nonwoven fabric and nanocellulose, wherein the nanocellulose has been chemically modified with acetic anhydride, hexamethyl disilazane, or hydroxyethylmethacrylate,
  wherein a flavoring agent is adsorbed in the nanocellulose, and wherein an active ingredient is adsorbed in the nonwoven fabric, the active ingredient selected from the group consisting of botanical materials, stimulants, amino acids, vitamins, antioxidants, nicotine components, cannabinoids, pharmaceutical agents, nutraceuticals, and combinations thereof.

7. The fleece material of claim 6, comprising about 10% by weight or higher of the nanocellulose.

8. The fleece material of claim 6, wherein the nanocellulose comprises cellulose nanofibrils having a diameter and length, wherein the diameter is from about 1 to about 100 nm, and the length is from about 1 to about 10 micrometers.

9. The fleece material of claim 6, wherein the nanocellulose comprises cellulose nanocrystals having a diameter and length, wherein the diameter is from about 5 to about 20 nm, and the length is from about 50 to about 400 nanometers.

10. The fleece material of claim 6, wherein the nanocellulose comprises bacterial cellulose.

\* \* \* \* \*